United States Patent [19]

Korosy et al.

[11] 4,366,134

[45] Dec. 28, 1982

[54] FLUE GAS DESULFURIZATION PROCESS

[75] Inventors: Louis B. Korosy, Wantagh; Peter J. Senatore, Baldwin, both of N.Y.

[73] Assignee: Pfizer Inc., New York, N.Y.

[21] Appl. No.: 94,392

[22] Filed: Nov. 14, 1979

[51] Int. Cl.$^3$ .............................................. C01B 17/00
[52] U.S. Cl. ..................................................... 423/243
[58] Field of Search ............... 423/242 A, 242 R, 243, 423/244 A, 244 R

[56] References Cited

U.S. PATENT DOCUMENTS

| | | | |
|---|---|---|---|
| 2,031,802 | 2/1936 | Tyrer | 423/243 |
| 2,086,379 | 7/1937 | Clark | 423/243 |
| 3,757,488 | 9/1973 | Austin et al. | 423/243 |
| 3,833,508 | 9/1974 | Austin et al. | 252/189 |
| 4,133,650 | 1/1979 | Germerdonk et al. | 55/49 |
| 4,140,751 | 2/1979 | Vassan | 423/243 |

OTHER PUBLICATIONS

Johnstone et al., *Industrial Engineering Chemisty*, vol. 30, No. 1, Jan., 1938, pp. 101-109.

Slack and Hollinden, *Sulfur Dioxide Removal from Waste Gases*, 1975, pp. 222-224.

Nissen et al., *Proceedings: Symposium on Flue Gas Desulfurization, New Orleans*, May 1976, pp. 843-864.

Oestreich, Equilibrium Partial Pressure of Sulfur Dioxide in Alkaline Scrubbing Processes, Oct. 1976.

Advanced Concepts: SO$_2$ Removal Process Improvements, Nov., 1978, pp. 1-28.

Farrington et al., "The Flakt—Boliden Process for SO$_2$ Recovery", Feb., 1979.

*Primary Examiner*—O. R. Vertiz
*Assistant Examiner*—Gregory A. Heller
*Attorney, Agent, or Firm*—Charles J. Knuth; Peter C. Richardson; Harold W. Ordway

[57] ABSTRACT

A regenerative process for the desulfurization of gas containing from about 100 ppm to about 30 volume percent sulfur dioxide in which the gas is contacted at from about 15° to 80° C. with an about 0.1 molar to saturated aqueous solution of potassium citrate at a pH of from about 3 to 9 and the contacted solution is then heated to strip sulfur dioxide therefrom.

11 Claims, No Drawings

FLUE GAS DESULFURIZATION PROCESS

BACKGROUND OF THE INVENTION

This invention relates to flue gas desulfurization. More specifically, it relates to a regenerative process for the removal of sulfur dioxide from flue gas and other gas streams.

Present processes for the removal of sulfur dioxide from such gas streams as flue gas can be divided into two categories, namely throwaway processes and regenerative or recovery processes.

In the throwaway process, exemplified as in U.S. Pat. No. 4,060,587, the sulfur dioxide content of the gas stream is normally removed by contacting the stream with an aqueous slurry of lime or limestone, resulting in the formation of a sludge of mainly calcium sulfite. Such a process, while relatively simple and currently the most popular for flue gas desulfurization, has major drawbacks which include the economic and ecological problems attached to the disposal of the sludge, the necessity of continuously supplying fresh absorbent to the system, and numerous operational problems such as the tendency toward crust formation.

As a result of such drawbacks with the throwaway process, numerous regenerative processes, in which the absorbent is recycled to the process and the absorbed sulfur dioxide is recovered in the form of a usable product, have been devised. Among these are processes in which the absorbent is a buffered aqueous solution of sodium citrate. In one version of such citrate processes, described, for example, by Vasan in *Chemical Engineering Progress*, Vol. 71, No. 5, May, 1975, pages 61–65, the sulfur dioxide absorbed in the citrate solution is recovered as sulfur by contacting the sulfur dioxide-rich solution with hydrogen sulfide. This approach, however, has certain disadvantages, including the necessity of generating and handling hydrogen sulfide. In an alternative version, disclosed, for example, by Nissen et al in *Proceedings: Symposium on Flue Gas Desulfurization—New Orleans*, EPA-600/2-76-136b, May, 1976, pages 843–864, by Farrington et al in "The Flakt-Boliden Process for SO$_2$ Recovery", presentation at the 1979 Annual Meeting of the Metallurgical Society of AIME, New Orleans, La., February, 1979, and by U.S. Pat. Nos. 2,031,802 and 4,140,751, the sulfur dioxide is recovered simply by stripping it, preferably with steam, directly from the absorbing solution. Such recovery, while eliminating the necessity of a regenerating chemical, does require considerable steam consumption.

It is therefore the object of the present invention to provide a regenerative process for the desulfurization of gases containing sulfur dioxide which has reduced chemical, operating and equipment costs over existing processes.

To date, attempts to use potassium salts in a regenerative process for the removal of sulfur dioxide from gas streams have not met with appreciable success. Such attempts are described in Slack and Hollinden, *Sulfur Dioxide Removal from Waste Gases*, 2nd Ed., Noyes Data Corporation, Park Ridge, N.J., 1975, pages 222–224, and in *Advanced Concepts: SO$_2$ Removal Process Improvements*, EPA-600/7-78-216, November, 1978, pages 1–28. Sodium and/or potassium hydroxides and carbonates are indicated as the preferred alkalis for buffering in the regenerative process of U.S. Pat. No. 4,133,650, in which the absorbent is a buffered aqueous solution of a dicarboxylic acid.

A method for the selective removal of sulfur dioxide from a gas also containing hydrogen sulfide in which the gas is contacted with an aqueous solution of an alkali metal salt of an organic acid, preferably potassium citrate, is disclosed in U.S. Pat. Nos. 3,757,488 and 3,833,508. The method fails, however, to disclose or suggest regeneration of the absorbing solution or recovery of the absorbed sulfur dioxide, much less a means for such regeneration and recovery.

From a study of equilibrium vapor pressures of sulfur dioxide over aqueous sulfite-bisulfite solutions, Johnstone et al, in *Industrial and Engineering Chemistry*, Vol. 30, No. 1, January, 1938, pages 101–109, concluded that the effect of temperature on the equilibrium vapor pressure of sulfur dioxide over homogeneous solutions of salts of weak acids should not differ greatly from the alkali sulfite-bisulfite solutions, in which sodium and potassium were found to be comparable. The assumption of the essential equivalence of sodium and potassium in absorption systems employing citrate ions was again implied by Oestreich in *Equilibrium Partial Pressure of Sulfur Dioxide in Alkaline Scrubbing Processes*, EPA-600/2-76-279, October, 1976, and by Rochelle in *Process Synthesis and Innovation in Flue Gas Desulfurization*, EPRI FP-463-SR, Special Report, July, 1977, pages 4–37 thru 4–43.

SUMMARY OF THE INVENTION

It has been found, however, that potassium citrate offers unexpected advantages over sodium citrate in regenerative sulfur dioxide absorption processes in that aqueous potassium citrate solutions not only have a much higher absorbing capacity for sulfur dioxide than corresponding sodium citrate solutions when under the same sulfur dioxide partial pressure, but also show a much greater increase with temperature of the vapor pressure of the sulfur dioxide in solution.

Accordingly, a process has been developed for the desulfurization of gas containing from about 100 ppm to about 30 volume percent sulfur dioxide, which comprises contacting the gas at a temperature of from about 15° to 80° C. with an aqueous solution at a pH of from about 3 to 9 containing potassium citrate at a concentration of from about 0.1 molar to saturation; separating the contacted gas from the contacted solution; and heating the separated solution to strip sulfur dioxide therefrom.

In preferred embodiments of the invention, the sulfur dioxide concentration in the gas is from about 0.1 to 5 volume percent; the contacting is effected at the adiabatic saturation temperature of the gas, particularly at about 50° C.; the pH of the solution is from about 4 to 6; the potassium citrate concentration is about 2 molar; the molar ratio of potassium cation to citrate in the solution is about 3; the heating is effected to the boiling point of the separated solution, particularly to from about 105° to 110° C.; sulfur dioxide is stripped from the separated solution with the use of open steam; the separated solution, after heating to drive off sulfur dioxide, is recovered for reuse in the desulfurization process; and the process is conducted at atmospheric pressure.

DETAILED DESCRIPTION OF THE INVENTION

While not wishing to be bound to a given theory, it is believed that the unexpected superiority of potassium citrate over sodium citrate in the regenerative process for sulfur dioxide removal from gas streams involves the formation of a thermally unstable complex involving potassium, citrate and bisulfite ions. The complex removes free bisulfite from, and thus increases the total sulfur dioxide solubility of, the system; upon heating, the absorbed sulfur dioxide is readily released from solution.

The process of the present invention is effective in the desulfurization of a wide variety of gases including those gas streams containing sulfur dioxide in amounts as low as about 100 ppm or lower as well as those in which the sulfur dioxide concentration is as high as about 30 volume percent.

Illustrative of such gases are utility flue gases, such as those resulting from the burning of fossil fuel such as coal and oil, in which the sulfur dioxide content of the gas may range from about 100 to 5000 ppm; industrial flue gases, such as the Claus tailgases and the gases from sulfuric acid plants which typically have a sulfur dioxide content of from about 2 to 4 volume percent; and smelter gases from the roasting of nonferrous ores, in which the sulfur dioxide content may be as high as 20 volume percent or more. The sulfur dioxide content of the gas to be treated by the present process will generally be from about 0.1 to 5 volume percent, however, the process being particularly suitable for flue gases from the burning of high-sulfur coal in which the sulfur dioxide content of the gas is usually from about 1000 to 5000 ppm.

These gases will generally be pretreated before introduction into the desulfurization process. For example, a hot flue gas may be subjected to electrostatic precipitation for particulate removal; cooled by heat exchange to slightly above the sulfuric acid dew point of the gas, normally about 125° to 250° C.; and then scrubbed in such as a venturi scrubber to remove residual particulates and strongly acidic gaseous components, such as hydrogen chloride and sulfur trioxide, which might be detrimental to the process equipment, as well as to cool and humidify the gas to its adiabatic saturation temperature, which with utility flue gases is about 50° C. Other constituents, such as oxygen, carbon dioxide and nitrogen oxides, which will not materially affect the process, are generally not removed from the gas.

The sulfur dioxide content of such a gas is removed in the present process by contacting the gas with an aqueous solution of potassium citrate, during which contact sulfur dioxide is absorbed into the solution. The term potassium citrate, herein and in the appended claims, is meant to include potassium citrate in which the citrate is in the form of the mono-, di- or tricitrate ion, alone or in combination, as well as in which the potassium ion is supplied also by potassium salts other than the citrate. Preferably, the potassium citrate introduced into the process is tripotassium citrate, in which the molar ratio of potassium cation to citrate is 3. The concentration of the potassium citrate in the solution may vary from about 0.1 molar to saturation, concentrations below about 0.1 molar being too dilute to achieve the desired results. The preferred concentration is about 2 molar.

The pH of the process solution may range from a low of about 3, which is essentially that for monopotassium citrate solutions, to a high of about 9, which is essentially that for solutions of tripotassium citrate. Preferably the absorption and the subsequent stripping, described hereinafter, are conducted in the pH range of from about 4 to 6. At a pH much below 4, the effectiveness for absorption of sulfur dioxide in the solution, particularly when treating gases containing low concentrations of sulfur dioxide, is greatly reduced, while at a pH of much above 6, the stripping of the absorbed sulfur dioxide from the solution requires excessive consumption of steam.

Although subatmospheric and superatmospheric pressures may be used, particularly during stripping, the process of the present invention is most practically conducted at atmospheric pressure. Under such condition, the sulfur dioxide-laden gas is contacted with the potassium citrate-containing solution at a temperature of from about 15° to 80° C. Temperatures substantially outside this range are not practical, since with temperatures much below 15° C., excessive cooling of the system is required, while at temperatures much above 80° C., the solubility of the sulfur dioxide in the absorbing solution is too low. Preferably the absorption is conducted at the adiabatic saturation temperature of the gas, which, as indicated hereinbefore, is about 50° C. for utility flue gases.

Any suitable gas-liquid contacting apparatus may be used for the absorption. Bubble-cap or tray columns, which are particularly suitable for countercurrent contacting operations in which the ratio of the gas to the liquid may be quite high, are generally preferred. Such apparatus, shown, for example, in U.S. Pat. No. 4,133,650 for this purpose, allows for simultaneous contact and separation of the gas and liquid streams and assures an efficient transfer of the sulfur dioxide from the former to the latter.

The contacted and separated potassium citrate solution containing the absorbed sulfur dioxide is heated to strip the sulfur dioxide therefrom. The heating is normally effected to the boiling point of the solution. At atmospheric pressure, this temperature will be from about 100° to 125° C. In a particularly preferred process using solutions about 2 molar in potassium citrate, the atmospheric or normal boiling point of the solution will be from about 105° to 110° C. Stripping of the heated solution can be accomplished in any suitable gas-liquid contacting unit. Especially suitable are countercurrent units, such as those preferred in the absorption step as well as packed columns. Although the stripping may be accomplished with indirect heating means, such as a reboiler, the use of open steam is preferred.

The sulfur dioxide and accompanying water in the overheads are cooled to remove the major portion of the water, and the resulting sulfur dioxide is used for any desired function such as for the manufacture of sulfuric acid. The separated potassium citrate solution depleted of sulfur dioxide is recovered for reuse in the process. Such recovery might include cooling to the absorption temperature, preferably by exchange against the contacted and separated sulfur dioxide-rich solution being heated for stripping; reducing the levels of sulfate ion, formed from the oxidation of sulfite during absorption and stripping, and other impurities, such as by removing a portion of the stream and replenishing with fresh tripotassium citrate and water; and adjustment of the citrate and potassium cation concentrations and pH of the solution.

The following examples are illustrative of the process of the present invention and are not to be construed as limiting the invention, the scope of which is defined by the claims.

EXAMPLE 1

Comparison of Potassium and Sodium Citrates for the Regenerative Absorption of Sulfur Dioxide Solutions of tripotassium citrate, trisodium citrate, dipotassium citrate and disodium citrate in deionized water, each at a concentration of 2.0 molar, were prepared using F.C.C. grades of the tribasic salts and, for the dibasic salts, a combination of the tribasic salts and F.C.C. grade citric acid. Each solution was then equilibrated at 50° C. against a synthetic gas stream of sulfur dioxide in nitrogen at two predetermined concentrations of the sulfur dioxide. Equilibrium was established by bubbling the gas through the solution until the concentration of the sulfur dioxide in the solution, as determined by iodimetric titration, remained constant. The equilibrations are summarized in Table I.

TABLE I

| Buffer | Equilibrating Gas, ppm $SO_2$ | Liquid, Gm $SO_2$/Liter |
|---|---|---|
| $K_3$ Citrate | 2,500 | 140 |
|  | 21,500 | 169 |
| $Na_3$ Citrate | 2,500 | 77 |
|  | 21,500 | 96 |
| $K_2H$ Citrate | 2,750 | 52 |
|  | 21,500 | 66 |
| $Na_2H$ Citrate | 2,750 | 17 |
|  | 21,500 | 32 |

Sulfur dioxide was added to 2.0 molar solutions of tripotassium citrate and trisodium citrate at 50° C. and atmospheric pressure to produce solutions having a sulfur dioxide partial pressure of about 1.6 mm mercury. The sulfur dioxide content of each of the solutions was determined iodimetrically. Aliquots of the solutions were then equilibrated in sealed containers at atmospheric pressure at temperatures of 50°, 70° and 90° C. The sulfur dioxide content of the equilibrium gas phase over each aliquot was determined by gas-liquid chromatography analysis, and the sulfur dioxide vapor pressure of the aliquot calculated therefrom. The testing is summarized in Table II.

TABLE II

| Buffer | $K_3$ Citrate | $Na_3$ Citrate |
|---|---|---|
| Liquid concentration, gm $SO_2$/liter | 126 | 77 |
| $SO_2$ vapor pressure, mm Hg |  |  |
| 50° C. | 1.7 | 1.6 |
| 70° C. | 7.5 | 4.8 |
| 90° C. | 22.8 | 12.6 |
| ratio 90° C./50° C. | 13.7 | 8.0 |

These results clearly show that, when compared to sodium citrate, aqueous solutions of potassium citrate not only have a much higher capacity for the absorption of sulfur dioxide but, more importantly, also show a much greater increase with temperature in the vapor pressure of the sulfur dioxide in solution. This combined effect gives potassium citrate a unique advantage in the citrate regenerative process for removing sulfur dioxide from flue gases, allowing for higher throughputs and a considerable reduction in steam consumption.

EXAMPLE 2

Absorption Data

A 2.0 molar solution of tripotassium citrate at 50° C. containing sulfur dioxide at a concentration of either 30 or 61 grams per liter was fed to the top plate of a 6-tray, 4-inch diameter, bubble-cap absorption column countercurrent to a synthetic flue gas at 50° C. of nitrogen containing about 2,500 ppm sulfur dioxide. The concentration of sulfur dioxide in the rich absorbent solution leaving the bottom of the column and in the desulfurized flue gas leaving the top of the column at equilibrium were determined iodimetrically, and the results are summarized in Table III.

TABLE III

| Absorption Data | | | |
|---|---|---|---|
| Solution, Gm $SO_2$/Liter | | Flue Gas, ppm $SO_2$ | |
| In | Out | In | Out |
| 30 | 107 | 2,550 | 20 |
| 61 | 130 | 2,640 | 190 |

Stripping Data

A sulfur dioxide-rich absorption solution containing about 140 grams per liter of sulfur dioxide in aqueous 2.0 molar tripotassium citrate solution was preheated to 106° C. and fed to the top plate of a 15-tray, 4-inch diameter, sieve tray stripping column countercurrent to open steam added to the column at a point just below the bottom tray. The steam rate was varied to discharge the regenerated absorption solution at various levels of sulfur dioxide. The results of the stripping operation are summarized in Table IV.

TABLE IV

| Stripping Data | | |
|---|---|---|
| Feed solution: 140.5 gm $SO_2$/liter, pH 4.8 | | |
| Stripped Solution | | Overhead Composition |
| Gm $SO_2$/Liter | pH | Water/$SO_2$, Gm/Gm |
| 121 | 5.0 | 2.3 |
| 108 | 5.2 | 2.8 |
| 82 | 5.5 | 4.4 |
| 71 | 5.6 | 5.9 |
| 61 | 5.8 | 7.0 |

The solubility of sulfur dioxide in a 2.0 molar solution of tripotassium citrate for a synthetic gas containing 2,500 ppm sulfur dioxide in nitrogen was determined, by the method of Example 1, to be 140 grams per liter. An equilibrium curve for the absorption was then constructed based on these values and the theoretical relationship between sulfur dioxide solubility, vapor pressure and hydrogen ion concentration. From this curve, it was determined that the absorption column with 6 actual plates was equivalent to about 3.0 theoretical plates.

Similarly, a 2.0 molar solution of tripotassium citrate containing 94 grams of sulfur dioxide per liter was determined to have an equilibrium vapor composition of 0.095 gram of sulfur dioxide per gram of water at the normal boiling point. An equilibrium curve for the stripper was constructed based on these values, and for the stripper run giving a stripped solution of 70 grams sulfur dioxide per liter, the number of theoretical plates in the column was determined to be about 4.5.

On the basis of the constructed equilibrium curves, the following regenerative desulfurization process is calculated:

A flue gas at 50° C. and containing 2,500 ppm sulfur dioxide is passed upward countercurrent to a regenerated aqueous solution 2 molar in tripotassium citrate at 50° C. and pH 5.7 containing 70 grams/liter of dissolved sulfur dioxide in a bubble-cap column having 3 theoretical plates. The treated flue gas exiting the top of the column contains 250 ppm sulfur dioxide, for a sulfur dioxide removal of 90 percent.

The sulfur dioxide-rich absorption solution leaving the bottom of the column, at pH 5.0 and containing 125 grams/liter of sulfur dioxide, is heated to 106° C. and fed to the top of a packed stripper column having 4.5 theoretical plates countercurrent to open steam at atmospheric pressure. The overhead vapor from the stripper, containing 7.5 grams of water per gram of sulfur dioxide, is cooled to condense the bulk of the water and leave a vapor stream of about 95 volume percent sulfur dioxide. The sulfur dioxide-depleted bottom stream from the column, containing 70 grams/liter of sulfur dioxide, is cooled, preferably including exchange against the sulfur dioxide-rich solution from the absorber, to 50° C. for recycle to the absorber.

With a stripping column having 10 theoretical plates, the weight composition of the stripper overheads is 5.6:1 water:sulfur dioxide. This overhead composition compares with a published value of 12:1 for a stripper column operating with sodium citrate solutions.[1]

[1](1) J. F. Farrington, Jr. and S. Bengtsson, "The Flakt-Boliden Process for SO$_2$ Recovery," presented at 1979 Annual Meeting of the Metallurgical Society of AIME, New Orleans, La., February, 1979

We claim:

1. A process for the desulfurization of gas containing from about 100 ppm to about 30 volume percent sulfur dioxide, which comprises
   contacting said gas at a temperature of from about 15° to 80° C. with an aqueous solution at a pH of from about 3 to 9 containing potassium citrate at a concentration of from about 0.1 molar to saturation to absorb sulfur dioxide from said gas into said solution;
   separating said contacted gas from said contacted solution;
   heating said separated solution to strip sulfur dioxide therefrom;
   and recovering said heated solution for reuse in said process.

2. The process of claim 1 wherein said sulfur dioxide concentration of said gas is from about 0.1 to 5 volume percent.

3. The process of claim 1 wherein said contacting is effected at the adiabatic saturation temperature of said gas.

4. The process of claim 3 wherein said temperature is about 50° C.

5. The process of claim 1 wherein said pH is from about 4 to 6.

6. The process of claim 1 wherein said potassium citrate concentration is about 2 molar.

7. The process of claim 1 wherein the molar ratio of potassium cation to citrate in said solution is about 3.

8. The process of claim 1 wherein said heating is effected to the boiling point of said separated solution.

9. The process of claim 8 wherein said heating is effected to from about 105° to 110° C.

10. The process of claim 1 wherein sulfur dioxide is stripped from said separated solution with the use of open steam.

11. The process of claim 1 conducted at atmospheric pressure.

* * * * *